United States Patent [19]

Affinito

[11] Patent Number: 5,260,095
[45] Date of Patent: Nov. 9, 1993

[54] VACUUM DEPOSITION AND CURING OF LIQUID MONOMERS

[75] Inventor: John D. Affinito, Richland, Wash.

[73] Assignee: Battelle Memorial Institute, Richland, Wash.

[21] Appl. No.: 933,447

[22] Filed: Aug. 21, 1992

[51] Int. Cl.$^5$ .............................................. C23C 26/00
[52] U.S. Cl. .................................... 427/124; 427/294
[58] Field of Search .................. 427/124, 255.5, 255.6, 427/294, 428

[56] References Cited

U.S. PATENT DOCUMENTS

| | | | |
|---|---|---|---|
| 3,489,593 | 1/1970 | Cohen | 427/255.6 |
| 4,098,965 | 7/1978 | Kinsman | 429/162 |
| 4,477,485 | 10/1984 | Muramatsu | 427/124 |
| 4,543,275 | 9/1985 | Akashi | 427/255.5 |
| 4,551,349 | 11/1985 | Kovacena | 427/255.6 |
| 4,555,274 | 11/1985 | Kitajima | 427/124 |
| 4,557,978 | 12/1985 | Mason | 427/255.6 |
| 4,774,141 | 9/1988 | Matsui | 427/124 |
| 4,844,851 | 7/1989 | Hotta | 427/124 |
| 4,933,129 | 6/1990 | Huykman | 427/124 |
| 5,024,879 | 6/1991 | Massa | 427/255.6 |

Primary Examiner—Shrive Beck
Assistant Examiner—Vi Duong Dang
Attorney, Agent, or Firm—Paul W. Zimmerman

[57] ABSTRACT

The present invention is the formation of solid polymer layers under vacuum. More specifically, the present invention is the use of "standard" polymer layer-making equipment that is generally used in an atmospheric environment in a vacuum, and degassing the monomer material prior to injection into the vacuum. Additional layers of polymer or metal may be vacuum deposited onto solid polymer layers.

Formation of polymer layers under a vacuum improves material and surface characteristics, and subsequent quality of bonding to additional layers. Further advantages include use of less to no photoinitiator for curing, faster curing, fewer impurities in the polymer electrolyte, as well as improvement in material properties including no trapped gas resulting in greater density, and reduced monomer wetting angle that facilitates spreading of the monomer and provides a smoother finished surface.

6 Claims, No Drawings

VACUUM DEPOSITION AND CURING OF LIQUID MONOMERS

This invention was made with Government support under Contract DE-AC06-76RLO 1830 awarded by the U.S. Department of Energy. The Government has certain rights in the invention.

FIELD OF THE INVENTION

The present invention relates generally to a method of making multilayer laminate structures from polymers and metals. More specifically, the present invention relates to forming solid polymer laminate layers under vacuum. Additional layers of polymer or metal may be added under vacuum as well.

BACKGROUND OF THE INVENTION

Laminate structures are used in many applications including but not limited to electronic devices, packaging material, and solar reflectors. Laminate structures in electronic devices are found in devices including but not limited to circuit elements and electrochromic devices wherein conductive polymer layers are combined and may include a metal layer. Electrochromic devices include but are not limited to switchable mirrors and switchable windows. Circuit elements include active elements, for example fuel cells and batteries, and passive elements, for example capacitors.

Presently, many laminate structures are made with solid polymer laminate layers. In packaging material and solar reflectors, a metal layer may be added to enhance optical reflectance. In electronic devices, a metal layer may be added to enhance electrical conductivity. In packaging material and solar reflectors, it is not necessary that the polymer layer or layers be conductive, whereas in electronic devices, especially batteries, the polymer layers must be conductive to act as electrolytes, anodes, and cathodes. Certain polymers when doped with selected salts are known to make suitable solid polymer ion conductive layers. Polymers known to be useful include but are not limited to polyethyleneoxide, polypropyleneoxide, polyorgansulfides, and polyanaline. Suitable salts include but are not limited to lithium salts, for example lithium perchlorate, and lithium hexafluoroarsenate. Although the anode, cathode, and electrolyte layers may all be of solid polymer material, when making a lithium polymer battery, it is preferred to have a layer of lithium metal as an anode.

Other polymers having added compounds, including but not limited to conductive powders and dyes, may be made by the present invention.

Presently, mass production of polymer and metal laminate structures used for electronic devices, and especially batteries, relies upon assembling preformed layers of polymer with a thin metal foil. Polymer layers are formed in production quantities by depositing a thin layer of a monomer onto a moving substrate that carries the monomer layer while and until it is cured. Many means for forming polymer layers are available, including but not limited to physical or mechanical liquid-monomer spreading apparati; for example, roll coaters, gravure roll coaters, wire wound rods, doctor blades, and slotted dies, as well as means for evaporation and deposition of a monomer vapor, for example polymer multilayer deposition. In any means having a moving substrate, the substrate has a velocity different from a nozzle or bath that deposits the liquid monomer onto the substrate. Hence, the term "moving substrate" as used herein excludes a situation wherein there is no relative motion or velocity differential between substrate and liquid-monomer dispensing means.

The polymer multilayer deposition technique is distinct from liquid-monomer spreading techniques because polymer multilayer deposition requires flash evaporation of the monomer. First, a monomer is atomized into a heated chamber that is under vacuum. Within the heated chamber the monomer droplets are evaporated, then exit the heated chamber, and monomer vapor condenses upon a substrate and is subsequently cured.

Curing may be done by any means including but not limited to heat, infrared light, ultraviolet light, electron beam, and other radiation.

When fabricating a battery, several techniques are used to combine a thin metal layer with a conductive polymer layer. One technique of battery fabrication is to combine a metal foil with a conductive polymer layer by press bonding a metal foil layer to a solid conductive polymer layer. Another technique is to spread uncured conductive monomer onto a metal foil and subsequently cure the conductive monomer to form a solid conductive polymer layer. Use of metal foil, especially lithium metal foil, results in minimum metal thicknesses of from about 1.5 mils (40 micrometers) to about 2 mils (50 micrometers).

Other battery fabrication techniques include making a thin metal layer by sputtering, plating, or vacuum depositing metal onto a metal substrate. A conductive polymer is then placed in contact with the metal. Either solid conductive polymer or uncured conductive monomer may be brought into contact with the metal to form the battery. Polymer laminate structures, including but not limited to batteries, are made by a procedure wherein individual layers are sequentially and separately formed then combined.

The performance and lifetime of polymer/polymer and polymer/metal laminate structures depend upon the quality of bonding between laminate layers. Bonding quality is affected by the presence of small, even microscale, areas of non-bonding at an interface between laminate layers. The bonding is especially critical between dissimilar layers; for example, polymer and metal layers. In batteries, reduced bond quality between polymer and lithium metal layers results in greater internal resistance of a battery produced with the laminate material and potential for "hot spots" upon recharging. In any structure, another problem with bonding dissimilar materials is chemical interaction between the materials. Areas of non-bonding can enhance chemical interaction because they may contain non-inert species or provide different surface characteristics at a boundary between bonded and unbonded areas.

Bonding between layers is therefore of great importance and is enhanced by several means, including but not limited to mechanical presses, and application of a second layer as a liquid with subsequent solidification upon a first solid layer at atmospheric pressure. The difficulty with these methods is that the low cost assembly of pressing or liquid application leads to low quality bonding as identified in U.S. Pat. No. 4,098,965, issued Jul. 4, 1976, to Kinsman, column 1, lines 47-50, wherein he states "[g]ases usually air, [that] are included in the void regions of the battery during assembly . . . ".

It is of great interest to those skilled in the art, then, to make batteries having high bond quality while making them in a cost effective manner.

SUMMARY OF THE INVENTION

The present invention is the formation of solid polymer layers under vacuum. More specifically, according to a first aspect of the present invention, the use of "standard" polymer-layer making equipment, is generally used in an atmospheric environment in a vacuum, and degassing the monomer material prior to injection into the vacuum. Additionally, other layers of polymer or metal may be vacuum deposited onto solid polymer layers.

Advantages of forming polymer layers in a vacuum include use of less to no photoinitiator for curing, faster curing, and fewer impurities in the polymer. Further advantages are improvement in material properties, including no trapped gas, resulting in greater density and reduced monomer wetting angle that facilitates spreading of the monomer and provides a smoother finished surface.

According to a second aspect of the invention, fabrication of laminate structures are carried out nearly simultaneously within a single vacuum chamber.

The subject matter of the present invention is particularly pointed out and distinctly claimed in the concluding portion of this specification. However, both the organization and method of operation, together with further advantages and objects thereof, may best be understood by reference to the following detailed description.

DESCRIPTION OF THE PREFERRED EMBODIMENT(S)

The method of the present invention is making a solid polymer layer by utilizing two known steps in combination with two additional steps that had not been combined prior to the present invention. The known steps of depositing a thin layer of liquid monomer onto a moving substrate followed by curing said monomer and forming the solid polymer layer, are combined with the steps of (a) placing the moving substrate into a vacuum chamber, and (b) degassing the monomer prior to depositing the degassed monomer onto the moving substrate in the vacuum chamber.

The substrate may be a temporary substrate from which the solid polymer layer product is removed after curing, or the substrate may be a permanent substrate forming part of the final product. The permanent substrate can be as simple as a base polymer layer having a metallized surface, for example, a solar reflector. The present invention may be used to place a protective coating upon the metallic surface. The permanent substrate may be as complex as a many-layered monolithic electronic device, for example, a capacitor in which the present invention may be used to place multiple polymer and metal layers to construct the device.

According to the present invention, any polymer-layer making method done in air or other atmosphere may be adapted to be carried out in a vacuum.

The apparatus of the present invention is a combination of known means with additional means that had not been combined prior to the present invention. Apparatus for making a solid polymer layer includes a moving substrate together with means for depositing a thin layer of liquid monomer onto the moving substrate, followed by means for curing the liquid monomer and forming the solid polymer. These means are combined with (a) means for creating a vacuum about the moving substrate, and (b) means for degassing the liquid monomer prior to depositing the degassed liquid monomer onto the moving substrate in the vacuum.

For making a polymer/metal laminate structure, the metal is vacuum deposited onto a cured solid polymer layer. Alternatively, the metal may be vacuum deposited onto a substrate, then liquid monomer deposited and spread under vacuum onto the metal surface. Any vacuum deposition technique may be used, but electron beam evaporation is preferred, especially for vacuum deposition of lithium metal. Vacuum deposition of metal results in metal thickness from about 10 angstroms to not more than about 0.4 mils (10 micrometers). For making a lithium polymer battery, it is preferred that the cathode and electrolyte are conductive polymer layers and that the anode is lithium metal.

Creating a vacuum about a moving substrate may be done in many ways, including housing an entire solid polymer-making apparatus in a vacuum chamber. Alternatively, a vacuum chamber may contain a moving substrate and a nozzle or coating head penetrating a wall of the vacuum chamber for admitting liquid monomer material.

Degassing of the liquid monomer may be carried out in any way, but it is preferred that the monomer be degassed by stirring it in a sealed vessel and removing residual gas with a vacuum pump. The vacuum pump draws a vacuum of a pressure that removes a sufficient quantity of gas from the liquid monomer to permit smooth flow of the liquid monomer through a nozzle into the vacuum chamber with reduced entrained gas expansion, thereby preventing nozzle clogging. The amount of entrained gas must also be sufficiently low to result in an acceptable quality polymer. Acceptable quality includes but is not limited to the final polymer being be free of void spaces and exhibiting a smooth surface.

The vacuum chamber may admit several liquid-monomer and other material inlets for permitting multiple monomer/polymer layers, curing means, as well as metal vacuum deposition means. With a multiple inlet vacuum chamber, laminate structures are made in one pass through the chamber. For example, a polymer layer may be cured, then a metallic layer deposited, and a subsequent polymer layer covering the metallic surface put in place, all within the vacuum chamber. Multiple passes of a product through the vacuum chamber can develop stacks of layered sets.

By placing liquid monomer spreading and vapor deposition of metal layer in the same vacuum chamber, the substrate velocity may be adjusted to accommodate both processes. Additionally, the flow of material through a nozzle may be adjusted to accommodate both processes. Similarly, vacuum pressure is set low enough to permit metal deposition yet high enough to prevent evaporation of the liquid monomer.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of making a first solid polymer layer, comprising the steps of:
   (a) placing a moving substrate into a vacuum chamber,
   (b) placing a mechanical liquid-monomer spreading apparatus into the vacuum chamber;
   (c) degassing a first liquid monomer,
   (d) depositing a first thin layer of the degassed liquid monomer from said liquid-monomer spreading apparatus onto the moving substrate within the vacuum chamber, and
   (e) curing said first thin layer.

2. A method as recited in claim 1, further comprising the step of:
   (a) vacuum depositing metal onto said first solid polymer layer.

3. A method as recited in claim 1, further comprising the steps of:
   (a) depositing a second thin layer of a second degassed liquid monomer onto said first solid polymer layer under vacuum,
   (i) curing said second thin layer.

4. A method as recited in claim 2, further comprising the steps of:
   (a) depositing a second thin layer of a second degassed liquid monomer onto said metal under vacuum,
   (i) curing said second thin layer.

5. A method as recited in claim 1, wherein said first liquid monomer is a liquid monomer cathode material.

6. A method as recited in claim 5, wherein a layer of metal is deposited onto said moving substrate in advance of depositing said liquid monomer cathode material.

* * * * *